United States Patent [19]

Ruhe

[11] Patent Number: 5,470,599

[45] Date of Patent: Nov. 28, 1995

[54] METHOD OF CONTROLLING MASA SHEET THICKNESS PRODUCED BY TORTILLA SHEETER

[75] Inventor: Thomas A. Ruhe, Fullerton, Calif.

[73] Assignee: J.C. Ford Company, La Habra, Calif.

[21] Appl. No.: 213,241

[22] Filed: Mar. 11, 1994

[51] Int. Cl.$^6$ ...................................................... A23P 1/00
[52] U.S. Cl. ........................... 426/231; 425/141; 426/502; 426/517
[58] Field of Search ...................................... 426/231, 502, 426/517; 425/141; 99/493

[56] References Cited

U.S. PATENT DOCUMENTS

| | | | |
|---|---|---|---|
| 5,124,163 | 6/1992 | Hayashi | 426/231 |
| 5,180,593 | 1/1993 | Mistretta et al. | 425/202 |
| 5,295,803 | 3/1994 | Ogawa et al. | 425/141 |

FOREIGN PATENT DOCUMENTS 2171225A 8/1986 United Kingdom ................... 425/141

OTHER PUBLICATIONS

Omron Sysmac C200H Programmable Controller brochure.
Omron Type Z4W–V25R LED Displacement Sensor instruction manual, 1991.
Omron Model C200H–NC112 Position Control Unit instruction sheet, 1990.

*Primary Examiner*—George Yeung
*Attorney, Agent, or Firm*—Knobbe, Martens, Olson & Bear

[57] ABSTRACT

A thickness control system for a high speed tortilla sheeting machine automatically adjusts a pinch point gap between a pair of sheeting rollers to maintain a generally uniform thickness of the produced "masa" (i.e., corn dough) sheet. The control system includes a pair of sensors, a controller, and a pair of actuators. The sensors continuously monitor the distance to the surface of a produced masa sheet. The controller derives from the sensor output signal a measurement of the thickness of the produced masa sheet, and compares this measurement to a preset thickness. The controller then directs one or more of the actuators to change the distance between the two sheeting rollers of the tortilla sheeting machine as necessary to produce a masa sheet at the desired preset thickness.

11 Claims, 7 Drawing Sheets

METHOD OF CONTROLLING MASA SHEET THICKNESS PRODUCED BY TORTILLA SHEETER

BACKGROUND OF THE INVENTION

1. Field of the Invention

The present invention relates to an improvement in high production sheeting devices for comestible products (e.g., tortillas and tortilla chips). More specifically, the invention relates to a control system which continuously monitors the thickness of a rolled sheet of the comestible product and automatically adjusts the sheeting device to maintain the rolled product sheet at a desired preset thickness.

2. Description of Related Art

Corn tortillas and tortilla chips are cut from a sheet of corn dough, called "masa," and then baked and/or fried. In mass production, the sheeting and cutting stages are accomplished by a tortilla sheerer.

High production tortilla sheerers feed masa from a hopper between a pair of large, stainless steel rollers which roll the masa into a sheet of substantially uniform thickness. The rollers are spaced apart in production to form a gap, known as a "pinch point gap," through which the masa passes. The masa adheres to the surface of one of the rollers, known as the exit roller, after passing through the pinch point gap. A third roller then cuts the masa into either tortillas or tortilla chips. The third roller, known as the cutting roller, commonly has either circular shaped (for tortillas) or triangular-shaped (for tortilla chips) cutting guides positioned on the cylindrical external surface of the cutting roller. The cut tortillas or chips then are stripped from the exit roller by a wire and/or a blower, or by a similar device.

High production tortilla sheerers automate virtually every step of the sheeting and cutting process. One challenge that remains, however, is to accurately control the thickness of the masa sheet before cutting.

The consistency of corn masa commonly varies over time depending upon humidity, temperatures, and other known factors, and occasionally will contain hard kernels of corn. If the distance between the sheeting rollers is rigidly fixed, the thickness of the exiting masa sheet typically depends on the masa consistency. The consistency of the masa can also vary within the hopper, and, thus, vary across the length of the sheeting rollers. As a result, the thickness of produced tortillas or chips varies.

Prior sheeting rollers commonly include adjustment screws to move the rollers relative to each other. The gap between the rollers thus can be adjusted by an operator of the tortilla sheerer.

In high speed production, a worker, at intervals, commonly measures the thickness of the exiting masa sheet or weighs the exiting masa sheet, and then adjusts the gap between the sheeting rollers, as necessary, using the adjustment screws. This human oversight increases cost and slows production. In addition, human intervention often leads to errors in production, which in turn results in waste and in an inconsistent product.

SUMMARY OF THE INVENTION

Applicants have recognized a need for an automated control system which continuously measures the thickness of the exiting masa sheet and adjusts the gap between the sheeting rollers accordingly.

The present invention involves an automated control system for a sheeting device that monitors (preferably continuously) the thickness of an exiting comestible product sheet, and adjusts the pinch point gap spacing between the sheeting rollers to maintain the product sheet at a desired thickness.

In accordance with one aspect of the present invention, the control system comprises a sensor positioned to detect the thickness of the product sheet. The sensor generates an input signal which is indicative of the thickness of the comestible product sheet. The control system also comprises a controller. The controller receives the input signal from the sensor and determines the thickness of the product sheet from the input signal. The controller also compares the determined thickness of the product sheet to a preset thickness, and generates an output signal in response to the comparison. An actuator of the control system receives the output signal from the controller. The output signal causes the actuator to move at least a portion of the sheeting rollers relative to each other so as to change the gap spacing between the sheeting rollers.

Another aspect of the present invention involves a method for automatically and continuously controlling the thickness of a comestible product sheet. The product sheet is produced by passing a comestible article between at least one pair of sheeting rollers. The method involves the steps of measuring the thickness of the comestible product sheet and generating a first signal which is indicative of the thickness of the comestible product sheet. The thickness indicated by the first signal is compared to a preset thickness and a second signal is generated in response to the comparison. At least one sheeting roller is then moved relative to the other in response to the second signal to change the pinch point gap.

In accordance with a preferred method, the thickness of the product sheet is measured by sensing a first distance which is defined between a reference point and a reference surface, and sensing a second distance which is defined between the reference point and an outer surface of the product sheet with the product sheet covering the reference surface. A first signal is desirably generated which is indicative of the first distance, and a second signal is desirably generated which is indicative of the second distance. These signals are quantified to represent the first and second distances, respectively. The second distance is then subtracted from the first distance to determine the thickness of the product sheet.

The present control system thus provides an accurate, automatic, and non-invasive way to continuously monitor the thickness of the exiting product sheet and to change the size of the pinch point gap as necessary. The control system also eliminates the need for human oversight during production, thus improving the consistency of the product and lowering labor costs.

BRIEF DESCRIPTION OF THE DRAWINGS

These and other features of the invention will now be described with reference to the drawings of preferred embodiments which are intended to illustrate and not to limit the invention, and in which.

DETAILED DESCRIPTION OF THE PREFERRED EMBODIMENTS

Figure 1:
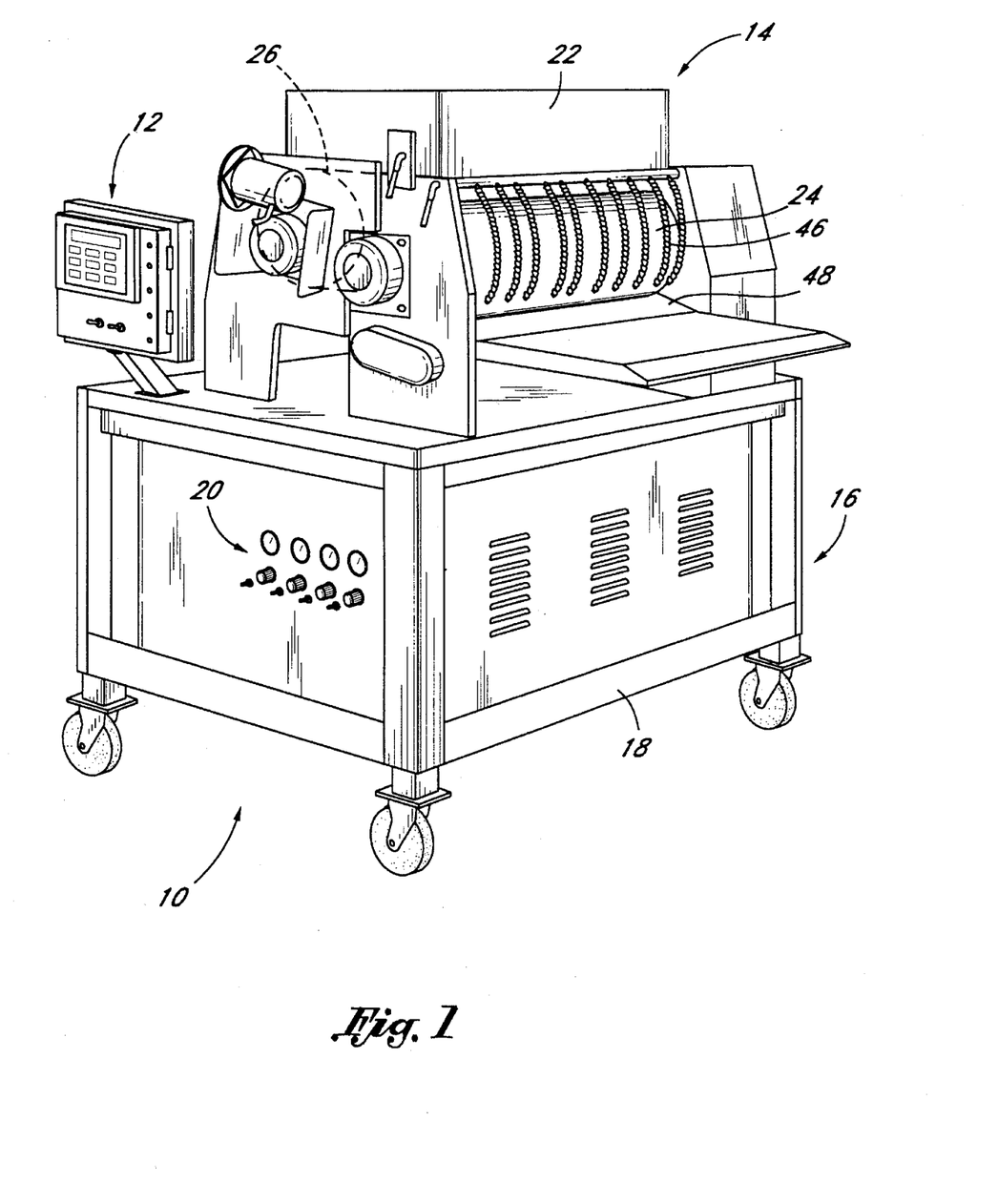
FIG. 1 is a perspective view of an automated tortilla sheerer in accordance with a preferred embodiment of the present invention.

FIG. 1 illustrates a tortilla sheerer 10 employing a thickness control system 12 configured in accordance with a preferred embodiment of the present invention. Though the present invention has equal applicability to a variety of different types of sheerers and other food rolling machines, FIG. 1 illustrates an exemplary tortilla sheerer 10, the basic understanding of which assists in an appreciation of the present invention.

With reference to FIG. 1, the sheerer 10 principally comprises a roller component 14 and a drive component 16. A lower housing 18 houses the drive component 16. The drive component 16 includes a conventional electrical motor (not shown) which drives the roller component 14 via a series of common gears and chains or belts (not shown), as known in the art. A conventional pneumatic control system 20 controls the pneumatic devices of the sheerer 10 (e.g., a stripping wire 44 and cutting roller 38).

The roller component 14 desirably rests on, or is attached to, the top of the lower housing 18 and includes a hopper 22 positioned above a pair of counter rotating rollers 24, 26. In the illustrated embodiment, the rollers are a generally cylindrical front roller 24 and a generally cylindrical rear roller 26. In one embodiment, the rollers 24, 26 have a slightly roughened surface (obtained, for example, with sandblasting). The rollers 24, 26 desirable rotate at the same revolution rate; however, it is understood that the rollers 24, 26 may rotate at different speeds if required by a specific application.

Figure 2:
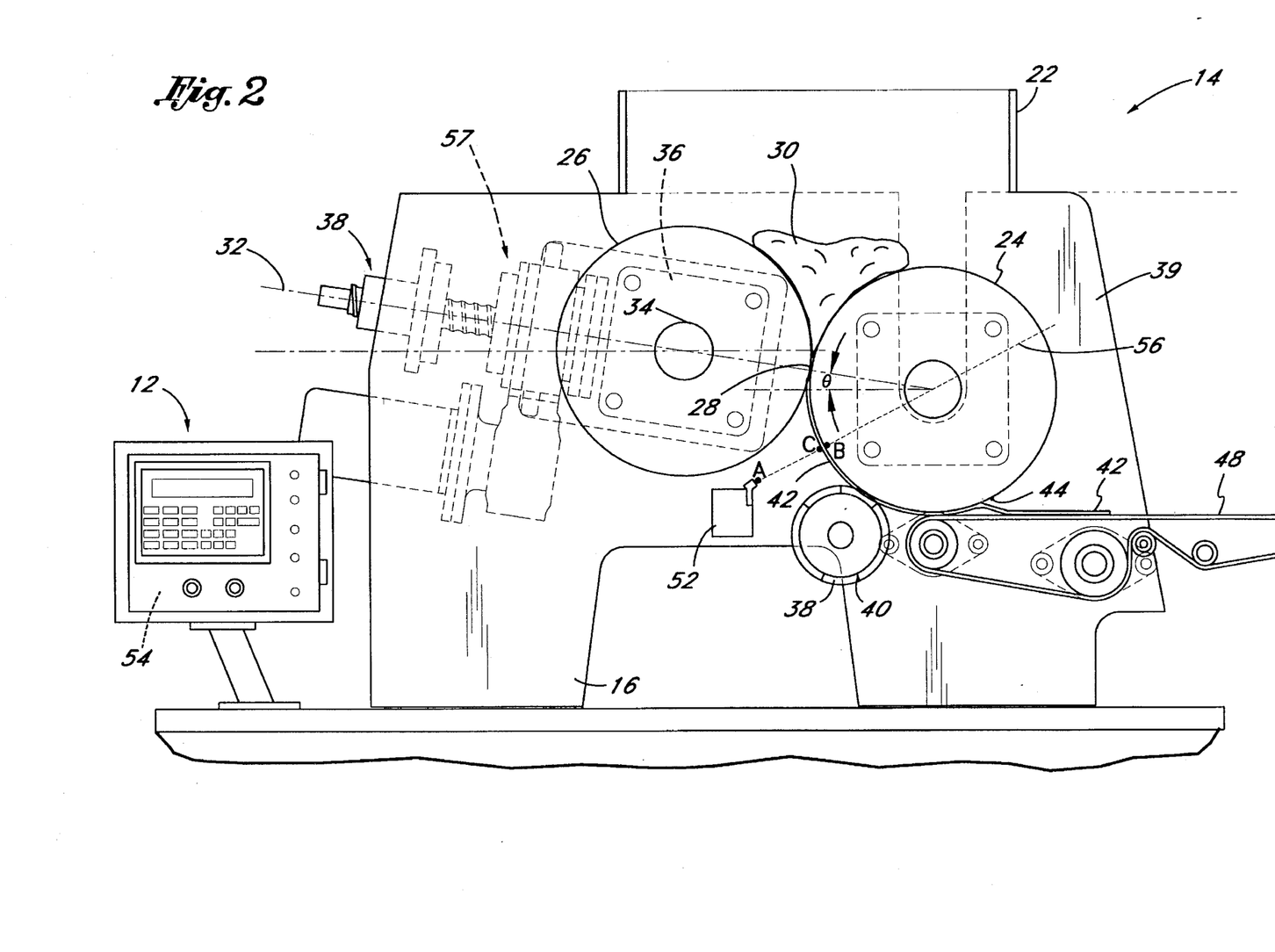
FIG. 2 is a side schematic view of a portion of a thickness control system and a roller component of the tortilla sheerer of FIG. 1.

The rollers 24, 26 are positioned parallel to each other and, as best seen in FIG. 2, define a pinch point 28, i.e., the point at which the rollers 24, 26 contact each other. In operation, as discussed below, the rollers 24, 26 are spaced slightly apart to form a gap between the surfaces of the rollers 24, 26 at the pinch point 28.

As FIG. 2 illustrates, the hopper 22 desirably is positioned above the rollers 24, 26 so as to contain masa (schematically represented and referenced by reference numeral 30) between the rollers 24, 26. As noted above, the term "masa" is used to denote a corn dough which is commonly used to form tortillas or tortilla chips. However, it is understood that the present sheerer 10 can be used with other types of comestible products, such as, for example, grain based doughs or like doughy food mixtures.

The rear roller 26 desirable moves relative to the front roller 24 to vary the spacing between the rollers 24, 26, i.e. to vary the spacing of the pinch point gap 28. For this purpose, the rear sheeting roller 26 is slidably mounted at its ends such that it may be moved relative to the front sheeting roller 24 along a sliding axis 32 (see FIG. 2). It should be understood, however, that in an alternative embodiment, the front roller 24 could move relative to the rear roller 26; or both rollers 24, 26 could move relative to each other in order to vary the spacing of the pinch point gap 28.

In the illustrated embodiment, the ends of the rear roller 26 can move independent of each other for variable adjustments across the length of the rear sheeting roller 26. That is, the gap spacing between the front and rear rollers 24, 26 may be greater at one end of the rollers 24, 26 than at the other end. This allows for the adjustment in gap spacing across the length of the rollers 24, 26 to account for fluctuations in consistency of the masa 30, as discussed below.

Figure 3:
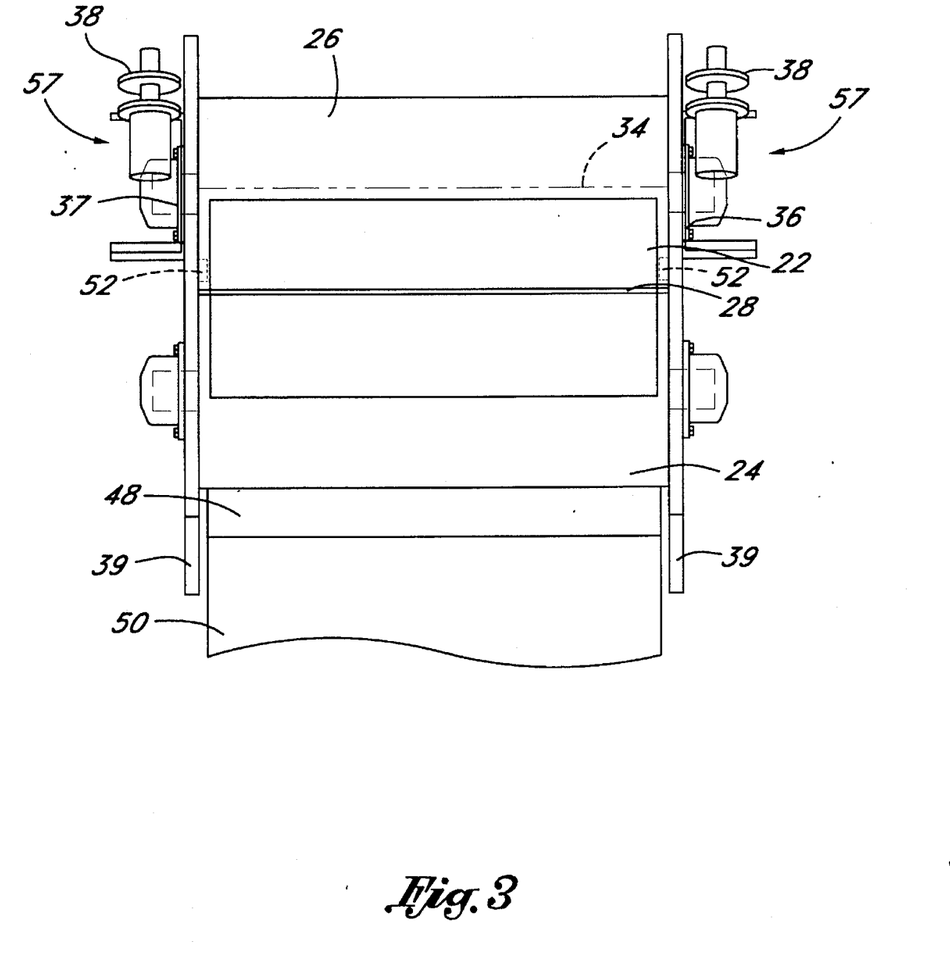
FIG. 3 is a partial top plan view of the tortilla sheerer of FIG. 1.

FIG. 2 illustrates one side of the roller component 14. As FIG. 2 shows, the rear roller 26 rotates about an axle 34. As illustrated in FIGS. 2 and 3, one movable bearing plate 36 supports one end of the axle 34 and an opposing bearing plate 37 (not shown in FIG. 2) supports the opposite end of the axle 34. Each bearing plate 36, 37 rides in a track (not shown) supported by a frame 39 of the roller component 14. A ball screw jack 38 is connected to each bearing plate 36, 37 to move the corresponding bearing plate 36, 37 within the track.

The axis of the track, which defines the slide axis 32, is desirably positioned to pass through the longitudinal axes (i.e., the axes of rotation) of both the rollers 24, 26, and through the pinch point 28. Movement of the bearing plates 36 within the tracks thus moves the rear roller 26 relative to the front roller 24 to vary the gap size of the pinch point 28. That is, a linear change in displacement of the rear roller 26 along the slide axis 32 creates a substantially equal linear change in the spacing between the rollers 24, 26 at the pinch point 28. As seen in FIGS. 1 and 2, it also is advantageous to position the tracks such that the slide axis 32 is skewed relative to the horizontal by an angle θ, as well understood in the art. So positioned, the rear sheeting roller 26 sits above the front roller 24.

As illustrated in FIG. 2, the roller component 14 also includes a cutting roller 38 which bears against the front roller 24. The cutting roller 38 carries cutting dies 40 which are shaped to cut the masa sheet (schematically represented and referenced by reference numeral 42) into the desired product shapes, for example, into round tortillas or triangular tortilla chips, as known in the art.

As illustrated in FIGS. 1 and 2, conventional means, such as a stripping wire 44 (FIG. 2) and/or pneumatic blowers 46 (FIG. 1), strip the cut masa sheet 42 from the front roller 24. A conveyor belt 48 transports the formed masa product (e.g., the tortillas or tortilla chip), away from the rollers 24, 26 to a platform (not shown).

The above described components of the tortilla sheerer 10 are desirably made of any of a variety of hard, durable, water-resistant and stain-resistant material, and preferably are made of stainless steel, because food processing and handling requires a high degree of cleanliness.

The tortilla sheerer 10 as so far described is generally typical of prior construction. However, in accordance with the present invention, the automated thickness control system 12 is incorporated into the tortilla sheerer 10 to control the thickness of the product sheet 42 (e.g., the masa sheet) produced by the sheeting rollers 24, 26.

Figure 4:
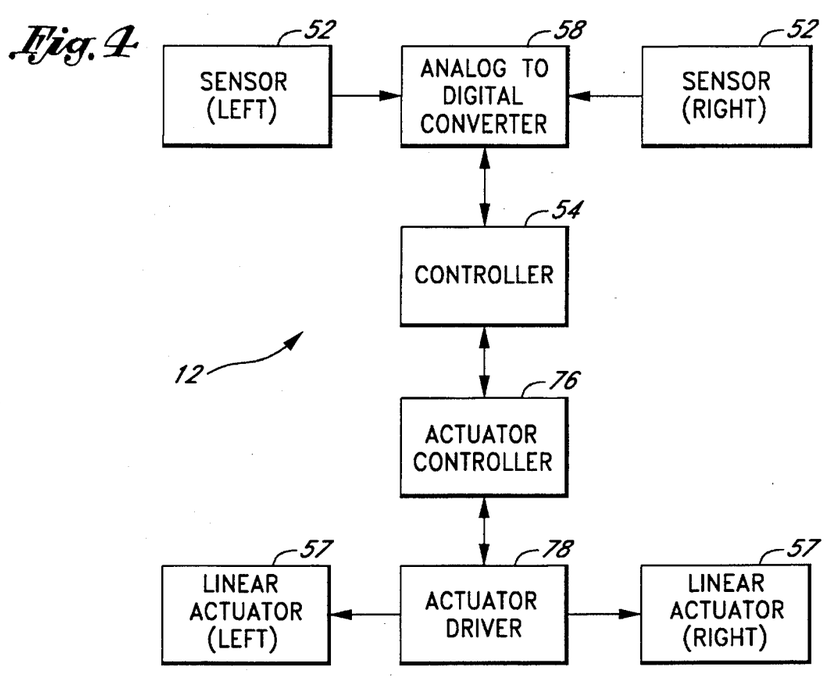
FIG. 4 is a block diagram of the thickness control system of FIG. 2.

As depicted in FIGS. 2 and 4, the thickness control system 12 includes at least one and preferably two thickness sensors 52 (one for the left end of the sheeting rollers and one for the right end of the sheeting rollers) connected to a controller 54. The controller 54 in turn connects to linear actuators 57 which move the rear sheeting roller 26, as described below.

FIG. 2 illustrates one of the thickness sensors 52. As seen from this figure, the thickness sensors 52 are mounted to detect the thickness of the exiting masa sheet 42. The sensors 52 desirably are positioned beneath and proximate to the pinch point 28 of the rollers 24, 26 so as to measure the thickness of the exiting masa sheet 42 before the cutting roller 38 acts upon the masa sheet 42. The sensors 52 also are arranged to measure the thickness of the masa sheet 42 along a detection axis 56 (FIG. 2) which passes through the axis of rotation of the front sheeting roller 24. This configuration ensures the measured displacement along the detection axis 56 is linearly proportional to the thickness of the masa sheet 42.

In the illustrated embodiment, the thickness sensors 52 comprise optical displacement sensors, such as the type commercially available as Omron Z4W-V25R LED from the Omron Corporation. Each optical displacement sensor 52 is arranged to measure the distance between its mounting point A and the surface B of the roller 24 or the outer surface C of the masa sheet 42 which covers the roller 24 during production. Each sensor 52 thus is arranged to measure the displacement of the surface C of the masa sheet 42 with respect to the surface B of the front sheeting roller 24, as explained below. Each optical displacement sensor 52 generates an analog signal which is linearly proportional to the displacement it detects. It is understood, however, that other types of sensors can be used which generate analog, digital or frequency outputs.

As mentioned above, the thickness control system 12 preferably includes two sensors 52. With reference to FIG. 3, one sensor 52 is mounted proximate to the left end of the front roller 24 and the other sensor 52 is mounted proximate to the right end of the front roller 24. In this manner, the thickness control system 12 monitors the masa sheet 42 at points proximate to both ends of the sheeting rollers 24, 26. It is appreciated, however, that the sensors 52 could be mounted at other locations along the length of the front roller 24, such as, for example, proximate to the center of the roller 24. It is also contemplated than the thickness control system 12 could employ more than two sensors 52 to monitor multiple locations along the length of the sheeting rollers 24, 26.

As depicted in FIG. 4, the thickness sensors 52 communicate with the controller 54. The thickness control system 12 may include a converter 58 to convert the signals from the sensors 52 into signals suitable for the controller 54 to analyze. In the illustrated embodiment, the convertor 58 comprises a standard analog-to-digital convertor, such as the Omron C200HAD001 4-channel analog input card. The analog signals generated by the optical displacement sensors 52 are provided as inputs to the analog-to-digital convertor 58. The analog-to-digital converter 58 converts the analog signals from the left and right displacement sensors 52 into digital signals, which are then carried by signal lines to the controller 54 for analysis.

Figure 5:
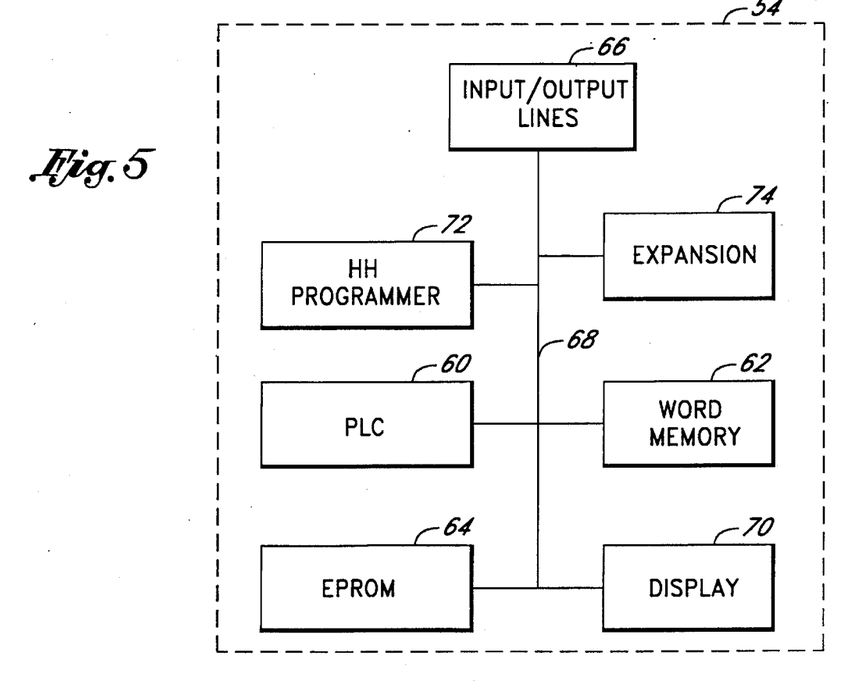
FIG. 5 is a block diagram which details the main functional elements of a controller of the thickness control system of FIG. 4.

FIG. 5 depicts the main functional elements of the controller 54. The controller 54 includes a programmable logic controller 60 (e.g., Omron C200HCPU01E programmable logic controller), a word memory 62 (e.g., Omron C200HMR8301 8K word memory module), an EPROM 64 (e.g., Omron C200HMP838 EPROM module), and input/output lines 66. These elements are interconnected by means of a backplane bus 68.

As used herein, the term "programmable logic controller" is intended to describe any programmable microcontroller capable of storing one or more instructions, and receiving one or more input signals and generating one or more output signals. In its preferred form, the term "programmable logic controller" refers to a class of programmable microcontroller devices for industrial use which allow logical manipulation of control signals to direct the operation of one or several devices, such as, for example, stepper or servo motors.

As illustrated in FIG. 5, the controller 54 can also include a display 70 (e.g., a Maple Systems Model No. 340A-OIT display module), a hand-held programmable unit 72 (e.g., an Omron C200HPR027E hand-held programmer), and an expansion unit 74 capable of accepting additional modules (e.g., an Omron C200HBC051B1 expansion rank), to provide additional monitoring and manual control of the controller 54. The backplane bus 68 of the controller 54 connects these elements to one another and to the programmable logic controller 60, the EPROM 64 and the word memory 62.

As depicted in FIG. 4, the controller 54 connects to an actuator controller 76. The actuator controller 76 interprets the output signal from the controller 54 and controls the distribution of power to the linear actuators 57. The actuator controller 76 is preferably a stepper control unit, such as the type commercially available from Omron as an Omron C200HNC112 2-channel stepper control card.

The actuator controller 76 in turn connects to an actuator driver 78 which selectively couples the linear actuators 57 to a power supply (not shown). The actuator driver 78 is preferably an American Precision P315 power supply and stepper motor driver.

In the illustrated embodiment, as best seen in FIG. 3, the thickness control system 12 desirably includes two linear actuators 57 connected to the ball jack screws 38 which are attached to the rear sheeting roller 26 as discussed above. Each linear actuator 57 independently drives the corresponding ball jack screw 38 on either the right or left end of the rear roller 26 to move the corresponding end of the rear roller 26 relative to the front roller 24 to increase or decrease the size of the gap at the pinch point 28. Both actuators 57 can also move simultaneously to uniformly increase or decrease the pinch point gap 28 across the length of the rollers 24, 26. It is contemplated that the structure of the left and the right linear actuators 57 will be substantially identical, and a description herein of one will be understood as applying equally to both, unless specified to the contrary.

Figure 6:
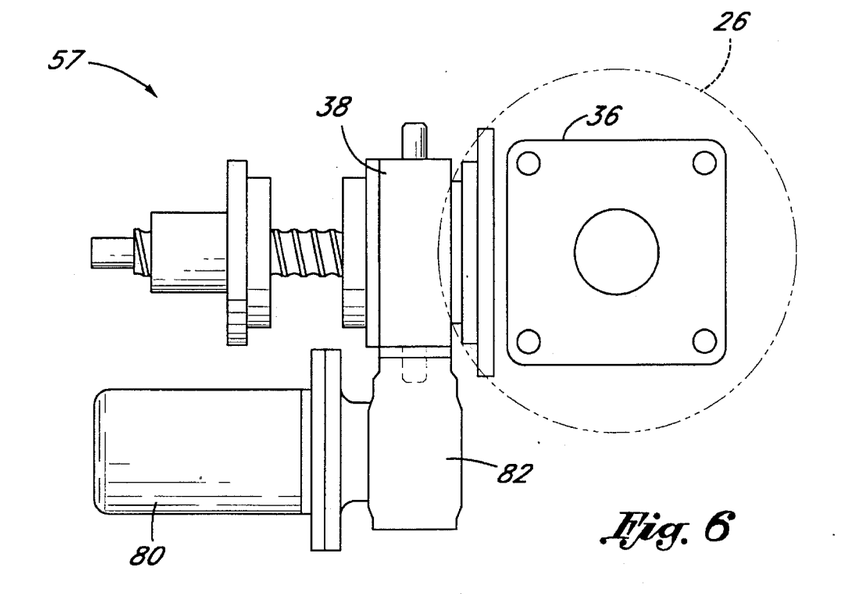
FIG. 6 is a side view of a linear actuator of the thickness control system of FIG. 2.

FIG. 6 depicts a preferred embodiment of the linear actuators 57. The linear actuators 57 desirably comprise a stepper motor 80 coupled through a right angle reducer 82 to the corresponding ball screw jack 38. The ball screw jack 38 connects to the corresponding bearing plate 36 as discussed above. In an exemplary embodiment, the stepper motor 80 is an American Precision M422 DC stepper motor, the right angle reducer 82 is a Nook 2420-12 right angle reducer with a 12:1 gear ratio, and the ball screw jack 38 is a Nook 5BSJ-UR five-ton ball screw jack with a 24:1 gear ratio. It should be understood that other stepper motors, right angle reducers, and ball screw jacks or other configurations for the linear actuator 57 which cause controllable displacement of the rear sheeting roller 26 are appropriate.

The combination of the stepper motor 80, the right angle reducer 82, and the ball screw jack 38 is preferably configured to produce incremental changes in the position of the rear sheeting roller 26 of approximately 0.001 inches. This degree of precision, however, is not necessary for tortilla production, and less accurate linear actuators also may be practical. It is contemplated that those skilled in the art can readily select appropriate actuator displacement characteristics to suit a specific application of the control system 12.

Figure 7:
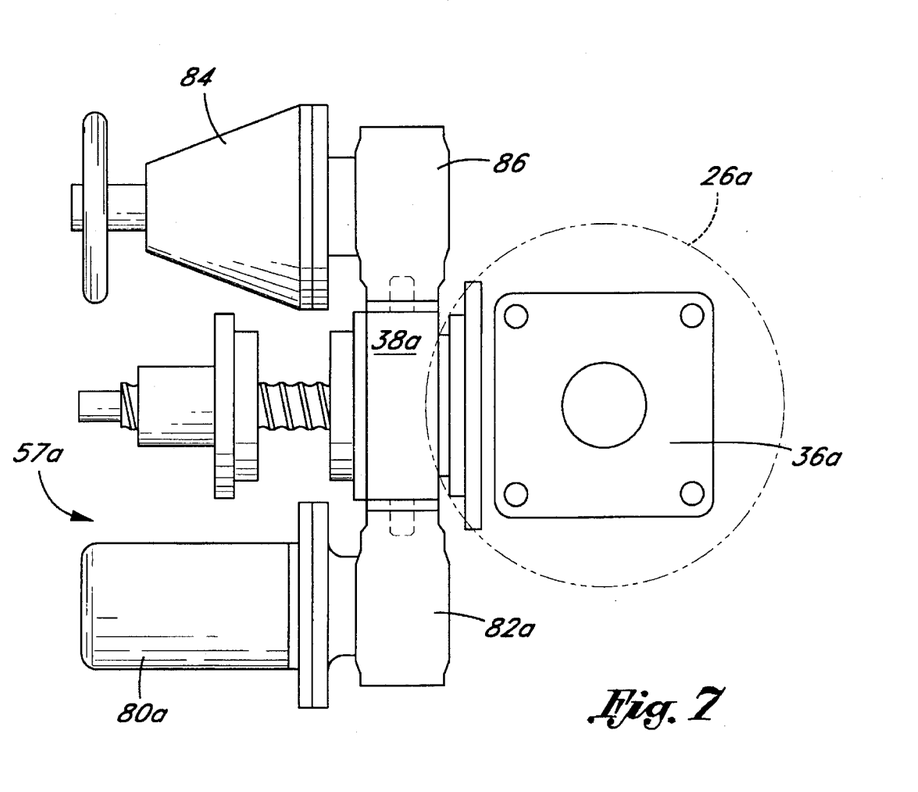
FIG. 7 is a side view of a linear actuator configured in accordance with an alternative embodiment of the thickness control system.

FIG. 7 depicts an alternative version of a linear actuator 57a. The alternative linear actuator 57a is similar to that described above with the addition of a handwheel 84, and like reference numerals with an "a" suffix have been used to designate similar elements of the two embodiments. The handwheel 84 is coupled with a ball screw jack 38a through a second right angle reducer 86. This embodiment of the linear actuators 57a thus provides manual override adjustment capabilities. That is, an operator can manually open or close the pinch point gap 28a between the sheeting rollers 24, 26 using the handwheel 84.

Figure 8:
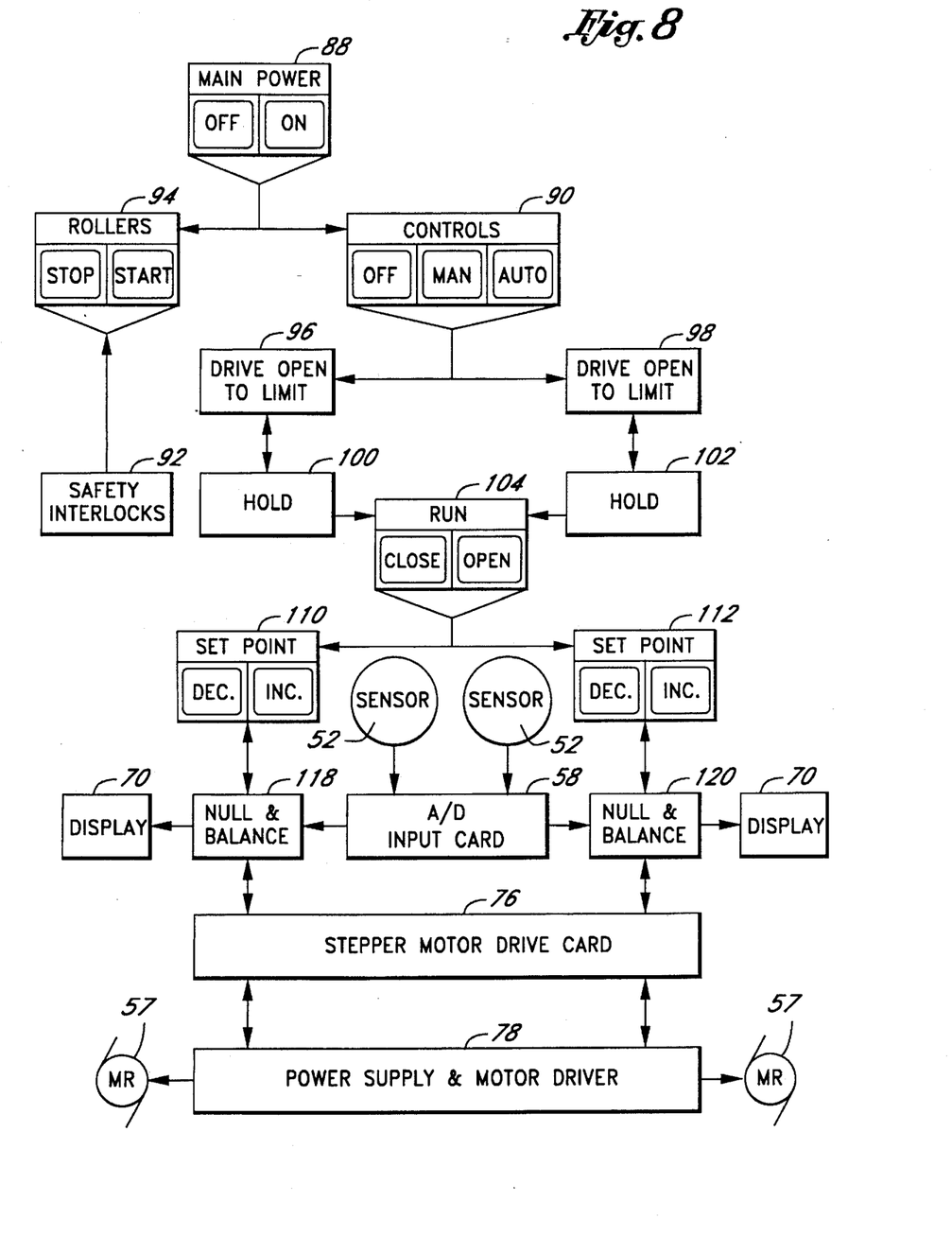
FIG. 8 is a hardware/software block diagram of the thickness control system of FIG. 2.
Figure 9:
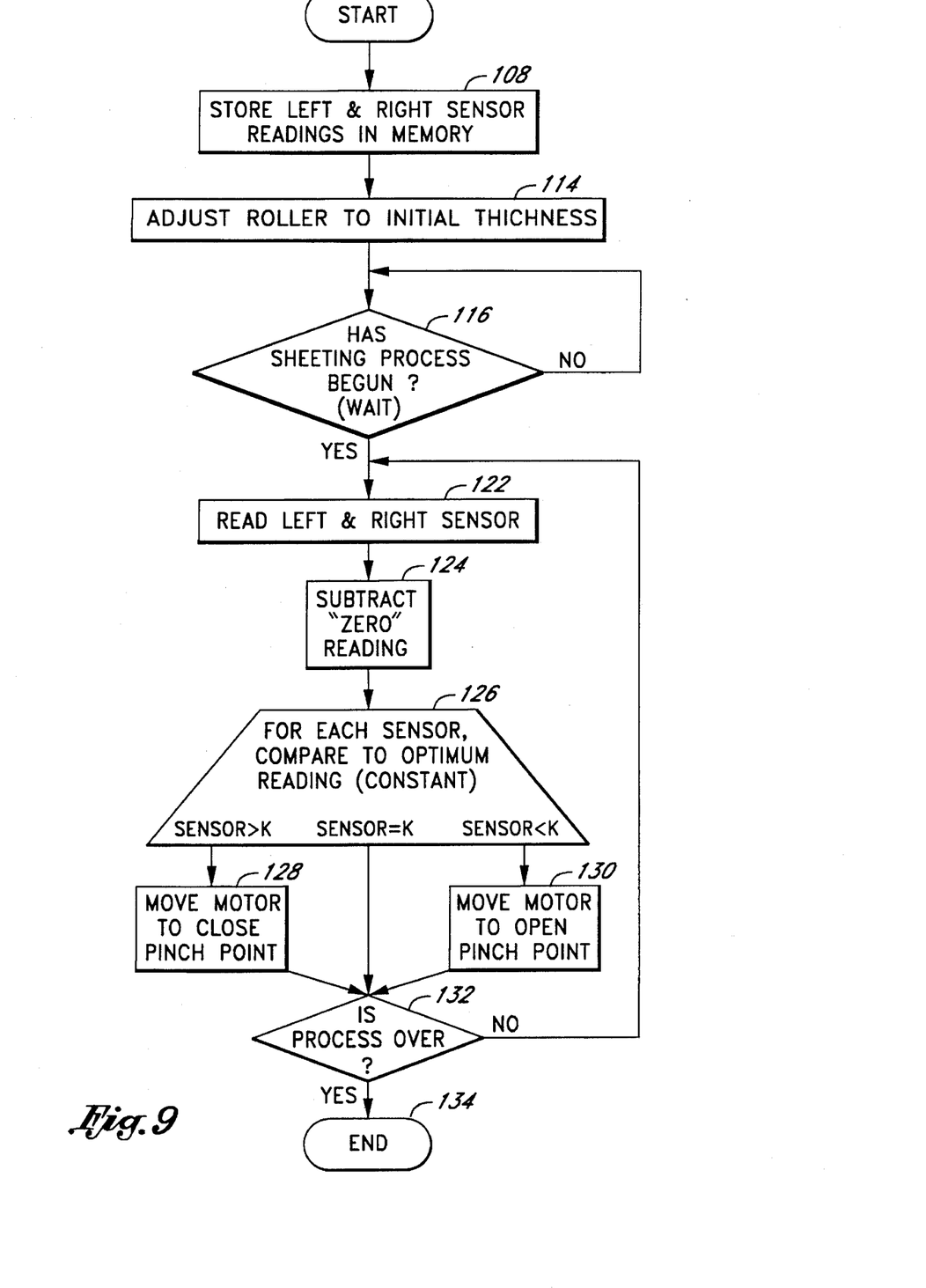
FIG. 9 is a generalized flowchart of a control program for the thickness control system of FIG. 4.

The operation of the thickness control system 12 is now described with primary reference to FIGS. 8 and 9. FIG. 8 depicts a hardware/software block diagram of the control system 12, and primarily represents the operation of the control system in an automated mode, as discussed below. FIG. 9 displays a representational flowchart of a control program to guide the operation of the programmable logic controller 60 of the controller 54. It should be understood that with the present embodiment of the programmable logic controller 60 (i.e., an Omron C200HCPU01E programmable logic controller), the control program is generally configured using ladder logic of the Omron Corporation. However, the flowchart of FIG. 9 depicts the general process flow for use with the programmable logic controller 60.

As seen in FIG. 8, the control system 12 includes an external main power switch 88 which controls the supply of three-phase power to the tortilla sheeting machine 10. Once an operator of the tortilla sheerer 10 activates the main power, the operator can then activate the operation of the rollers (i.e., cause rollers to rotate) via the start/stop switch 94. However, as represented in the operation block 92, the rollers will not start when the start switch is depressed unless all safety interlocks are in place (e.g., chain guards, etc. are closed and locked).

The control system 12 operates in either a manual mode or an automated mode, as selected by an external control switch 90. In the manual mode, the operator directly instructs the control system 12 via set point buttons to adjust the spacing between the sheeting rollers 24, 26 to a specified pinch point gap spacing. The control system 12 accordingly positions the rear sheeting roller 26 by actuating the linear actuators 57. The operator can also adjust (open and close) the gap spacing between the rollers 24, 26 via the same set point buttons.

In the manual mode, the control system 12 monitors the thickness of the produce sheet 42 (e.g., masa sheet), and displays the thickness on the display 70. However, the thickness is not used, in the manual mode, to cause automatic adjustment. The spacing of the gap 28 thus remains set at the preset amount, regardless of the consistency of the product mixture 30 and of the thickness of the product sheet 42. The operator enters new instructions using the set point buttons in order to change the gap spacing if the product sheet thickness is thicker or thinner than desired.

In the automated mode, as illustrated in FIG. 8, the control system 12 initially drives both actuators 57 open to their limit (see operation blocks 96, 98), and then holds the actuators 57 at the open position (see operation blocks 100, 102) until the operator activates the close operation with a "Run" switch 104.

When the close operation is activated, the control system 12 can begin active sheeting operation. Before the sheeting process begins, however, the controller 54 "zeroes" the left and right sensors 52 by reading the digitized sensor signals while the front sheeting roller 24 is "empty." That is, with reference to the illustrated embodiment of FIG. 2, the displacement sensors 52 measure the distance between their respective mounting points A and the surface B of the front roller 24 with no masa present. Each displacement sensor 52 then produces a signal indicative of the distance between the front roller 24 and the sensor 52. The converter 58 converts this signal into a signal suitable for interpretation by the controller 54 and sends the converted signal to the controller 54, as discussed above.

The control program, which is adapted for use with the programmable logic controller 60, then "zeros" the readings from the sensors 57. In other words, the initial reading becomes the zero displacement reading. This operation is represented in the flowchart of FIG. 9, in a first activity block 108 where the control program stores the displacement readings from the left and right sensors 52 in word memory 62. The stored sensor readings establish an initial reference point from which the thickness of the product sheet 42 on the front roller 24 (FIG. 2) will be measured. For the purpose of discussion, these initially stored sensor readings will be referred to as the "zero displacement readings."

As depicted in FIG. 8, the operator uses the "Set Point" buttons 110, 112 to set a desired preset thickness for each corresponding end of the sheeting rollers 24, 26 once the zero displacement readings are stored in memory 62. The control program, as represented in FIG. 9, then initially sets the rear sheeting roller 26, at operation block 114, to produce the desired product sheet thickness. Specifically, the control program activates the left and right linear actuators 57 via the stepper motor controller 76 (FIG. 4) and the actuator driver 78. The stepper motor controller 76 initiates displacement of the linear actuators 57 in an amount required to set the pinch point gap 28 at a spacing specific to produce the desired thickness of the product sheet 42 selected by the operator.

After adjusting the rear sheeting roller 26 to an initial gap spacing (i.e., to an initial thickness of the product sheet 42), the controller 54 determines whether the sheeting process has begun as represented in a decision block 116. If the sheeting process has not started, the control program remains idle (i.e., waits). Once the sheeting process begins, the control program proceeds to a null and balance routine, as represented in operation blocks 118, 120 of FIG. 8. The null and balance routine is discussed in detail below.

The sheeting process begins with the actuation of a switch (not shown) which begins the flow of masa. As depicted in FIG. 2, the masa 30 in the hopper 22 feeds into the pinch point gap 28 between the sheeting rollers 24, 26 once the sheeting process begins. The masa 30 continues to flow between the rollers 24, 26 during the sheeting process. The rotating sheeting rollers 24, 26 draw the masa 30 into the pinch point gap 28 where the rollers 24, 26 compress the masa 30 to form the masa sheet 42. The masa sheet 42 adheres to the front roller 24 after passing through the pinch point gap 28, as known in the art.

The displacement sensors 52 measure the distance between their respective mounting points A and the surface C of the masa sheet 42 which covers the front roller 24 during the sheeting process. In this manner, the sensors sense the displacement of the surface C of the masa sheet 42 with respect to the front roller surface B to ascertain the thickness of the masa sheet 42, as discussed below. The signal generated by the sensors 52 during this stage of the operation is indicative of the distance between the sensors 52 and the surface C of the masa sheet 42. As represented in FIG. 8, the converter 58 converts the analog signal from the sensors 52 to a digital signal and sends it to the controller 54 which performs the null and balance routine, as represented in operation blocks 118, 120.

As represented in FIGS. 8 and 9, the controller 54, guided by the null and balance routine of the control program, analyzes the digital signals sent by the converter 58 to ascertain the thickness of the masa sheet 42 and to determine whether the spacing of the pinch point gap 28 should be increased or decreased in accordance with the desired preset thickness. Specifically, with reference to FIG. 9, the controller 54 reads the data input from the left and right displacement sensors 52, as represented in an activity block 122. The control program, at activity block 124, then recalls the zeroed displacement readings from word memory 62 (FIG. 5) and compares these values from the corresponding operational sensor readings. In the illustrated embodiment, the control program subtracts the stored zero displacement reading from the left sensor 52 from the operational reading from the left sensor 52. The control program also subtracts the stored zero displacement reading from the right sensor 52 from the operational reading from the right sensor 52. The difference between the zero displacement reading and the operational reading is indicative of the thickness of the masa sheet 42 at the corresponding sides of the rollers 24, 26.

As represented in a logic block 126 of FIG. 9, the control program compares the calculated thickness from the sensor readings with the desired preset thickness to determine whether the spacing of the pinch point gap 28 should be increased or decreased or should remain constant to obtain the desired preset thickness.

If the calculated thickness is thicker than the desired preset thickness, the control program proceed to activity block 128 and generates an output signal which instructs one or more of the linear actuators 57 to move the rear sheeting roller 26 closer to the front roller 24 to decrease the pinch point gap spacing. For this purpose, as represented in FIG. 8, the controller 54 communicates control output signals to the actuator controller 76 (e.g., the stepper motor drive card). The actuator controller 76 in response instructs the actuator driver 78 (e.g., the power supply and motor driver) to move one or more of the linear actuators 57 by an incremental amount to effect the decrease in the spacing of the pinch point gap 28.

In the illustrated embodiment, the control system 12 can independently adjust the spacing of the pinch point gap 28 on either end of the rear roller 26. That is, the controller 54 can instruct either actuator 57 independent of the other actuator 57.

It should be understood that very small changes in the thickness of the masa sheet 42 need not necessarily cause a change in the adjustment. Because of the characteristic of doughy matter, small differences can simply be created due to the texture of the material or air within the material. Accordingly, it is advantageous to select a threshold change which occurs over a selected period of time before a change is activated with the stepper motor 80. In other words, if the average thickness of the masa sheet 42 as detected at the left or right ends of the front sheeting roller 24 varies by at least a preselected threshold amount for a preselected threshold time period, the controller 54 then causes an adjustment to compensate for the thickness variation from the desired thickness.

With reference to the logic block 126 of FIG. 9, if the calculated thickness is thinner than the desired preset thickness, the control program generates an output signal which instructs one or more of the linear actuators 57 to move the rear sheeting roller 26 away from the front roller 24 to increase the spacing of the pinch point gap 28 as represented in an activity block 130. For this purpose, as represented in FIG. 8, the controller 54 communicates the appropriate control output signal, which was determined by the null and balance routine (as represented by operation blocks 118, 120 of FIG. 8), to the actuator controller 76 (e.g., the stepper motor driver card). The actuator controller 76 instructs the actuator driver 78 (e.g., the power supply and motor driver) to move one or more of the linear actuators 57 by an incremental amount to effect the increase in the pinch point gap spacing.

The control program advances to decision block 132 after it instructs the linear actuators 57 to increase or decrease the pinch point gap spacing. As represented in FIG. 9, the control program also proceeds to decision block 132 if the operational masa sheet thickness is equal to the desired preset thickness, or at least within the preselected threshold amount of the desired preset thickness, as discussed above.

The control program, at discission block 132, determines whether the sheeting process is complete or continues. If the sheeting process continues, the control program returns to activity block 122 to sample additional readings of the sensors output signals. The control program then advances as described above to determine whether the pinch point gap spacing needs to be adjusted.

If the control program determines that the sheeting process is complete, the control program advances to the STOP block 134. The control program remains halted until restarted.

With reference to FIG. 8, the display 70 of the control system 12 continuously displays the operational thickness of the masa sheet 42 and the desired preset thickness. The display 70 desirably displays the preset thicknesses and the calculated thicknesses at each end of the front sheeting roller 24. The display 70 also displays the operational mode of the control system 12 (e.g., manual or automated).

When the tortilla sheerer 10 runs in the automated mode with the desired preset thickness input, the tortilla sheeter 10 produces a masa sheet 42 of substantially uniform thickness. Further human intervention is not required. Thus, the present control system 12 eliminates the need for human oversight and control during production to improve product consistency and lower production costs.

Although the invention has been described in terms of certain preferred embodiments, other embodiments apparent to those skilled in the art are also within the scope of the present invention. Accordingly, the scope of the invention is intended to be defined only by the claims which follow.

What is claimed is:

1. A method for automatically and continuously controlling the thickness of a comestible product sheet produced by passing a comestible product between at least one pair of sheeting rollers, wherein the thickness of the comestible product sheet is substantially equal to a pinch point gap defined between opposing surface of the pair of sheeting rollers, said method comprising the steps of:

measuring the thickness of the produced comestible product sheet at a location where the produced comestible product sheet covers at least a portion of one of the sheeting rollers;

generating a first signal indicative of the thickness;

comparing the thickness indicated by said first signal to a preset thickness;

generating a second signal in response to the comparison between said thickness indicated by said first signal and said preset thickness; and moving the sheeting rollers relative to each other in response to said second signal to change the size of the pinch point gap.

2. The method of claim 1, wherein said step of measuring the thickness of the product sheet comprises the steps of:

sensing a first distance defined between a sensor and a rolling surface of the sheeting roller on which the product sheet is measured;

sensing a second distance defined between said sensor and a surface of the product sheet with the product sheet covering the rolling surface of the sheeting roller; and comparing the second distance and the first distance.

3. The method of claim 2, wherein said step of measuring the thickness of the product sheet additionally comprises the steps of:

generating a first signal indicative of said first distance;

generating a second signal indicative of said second distance; and quantifying said first and second signals.

4. The method of claim 1, wherein measuring the thickness of said produced comestible product sheet on one of the sheeting rollers involves measuring the thickness along an axis which passes through a rotational axis of the sheeting roller on which the product sheet is measured.

5. The method of claim 1 additionally comprising the step of cutting the produced comestible product sheet while on said sheeting roller after measuring the thickness of the product sheet.

6. The method of claim 2, wherein sensing the first and second distances involves non-invasively measuring said distances without physically contacting the product sheet or the roller surface.

7. The method of claim 6, wherein sensing the first and second distances involves optically sensing said distances.

8. The method of claim 1, wherein measuring the thickness of the produced comestible product sheet on one of the sheeting rollers involves measuring the thickness at a first end of the sheeting roller on which the product sheet is measured, and moving the sheeting rollers relative to each other involves moving one side of the sheeting rollers in response to said second signal to change the size of the pinch point gap at said first end.

9. The method of claim 8, wherein said measuring the thickness of the produced comestible product sheet on one of the sheeting rollers also involves measuring the thickness at an opposite, second end of the sheeting roller on which the product sheet is measured.

10. The method of claim 9 additionally comprising the steps of generating a third signal indicative of the thickness of the product sheet on the second end of the sheeting roller, comparing the thickness indicated by said third signal to a preset thickness, generating a fourth signal in response to the comparison between said thickness indicated by said third signal and said preset thickness, and moving the corresponding opposite side of the sheeting rollers relative to each other independent of first end of the sheeting rollers and in response to said fourth signal to change the size of the pinch point gap.

11. The method of claim 1, wherein measuring the thickness of the product sheet involves measuring the thickness at a point proximate to and beneath the pinch point between the rollers.

* * * * *

UNITED STATES PATENT AND TRADEMARK OFFICE
CERTIFICATE OF CORRECTION

PATENT NO. : 5,470,599
DATED : November 28, 1995
INVENTOR(S) : Thomas A. Ruhe

It is certified that error appears in the above-indentified patent and that said Letters Patent is hereby corrected as shown below:

Replace "sheerer" with --sheeter-- at every occurrence.

Column 5, line 44, replace "than" with --that--.

Signed and Sealed this

Twenty-fifth Day of June, 1996

Attest:

BRUCE LEHMAN

Attesting Officer

Commissioner of Patents and Trademarks